(12) United States Patent
Ishida et al.

(10) Patent No.: US 6,625,586 B1
(45) Date of Patent: Sep. 23, 2003

(54) MODEL OPTIMIZATION ADAPTIVE CONTROL METHOD

(75) Inventors: Shintaro Ishida, Tokyo (JP); Hiroshi Yokoi, Hokkaido (JP); Mitsuru Kurotaki, Hokkaido (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 207 days.

(21) Appl. No.: 09/656,734

(22) Filed: Sep. 7, 2000

(30) Foreign Application Priority Data

Mar. 8, 2000 (JP) .......................................... 2000-063508

(51) Int. Cl.[7] .............................................. G06F 15/18
(52) U.S. Cl. ................................ 706/14; 706/45; 706/12
(58) Field of Search ................................ 706/45, 12, 14

(56) References Cited

PUBLICATIONS

Michael J. A. Berry et al; Data Mining Techniques; 1997; John Wiley & Sons; 335–349.*

* cited by examiner

Primary Examiner—Ramesh Patel
Assistant Examiner—Joseph P. Hirl
(74) Attorney, Agent, or Firm—Smith, Gambrell & Russell, LLP

(57) ABSTRACT

A state of a control object is detected, the detected state of the control object is made an initial value, and a simulation with a control rule, a control gain, and an instruction signal value, which control the control object, as parameters is sequentially carried out by using an internal model expressing its own control system and by a computation method to optimize a predetermined evaluation standard, so that the control rule, the control gain, and the instruction signal value to optimize the evaluation standard are obtained and the control object is controlled.

10 Claims, 6 Drawing Sheets

MODEL OPTIMIZATION ADAPTIVE CONTROL METHOD

BACKGROUND OF THE INVENTION

1. Field of the Invention

The present invention relates to an adaptive type automatic control method in which even if a trouble or variation of control system characteristics especially not predicted to a control system occurs in an automatic control system, the control system can be stabilized.

2. Description of the Related Art

In an automatic control system, a fail safe system is adopted to cope with a trouble of a control system or an erroneous operation. As a conventional fail safe system, there is known, for example, a redundancy system in which controllers, actuators, sensors, and the like are provided double, triply, or more, or a system in which internal models corresponding to control object models of predicted troubles or the like are stored in a control system, the control object model is identified, and a control rule is reconfigured by the internal model corresponding to that.

However, in the former redundancy system, since the controllers, actuators, sensors, and the like are multiply provided, there is a fear that the hardware increases, and the costs, weight, and volume increase.

On the other hand, in the latter system of reconfiguring the control rule, since the control rule is reconfigured by the internal model prepared in advance correspondingly to the identified control object model, the hardware is not increased. However, conventionally, since the set of the internal models is finite, in the case where the identified control object model exceeds the category of the set of the predicted internal models, there is a fear that it becomes difficult to reconfigure the control rule.

SUMMARY OF THE INVENTION

Therefore, the present invention has been made in view of such circumstances and has an object to provide a model optimization adaptive control method which does not cause an increase in hardware and is most suitable for a control purpose when a normal function is still used under an identified control object state even if any state change occurs.

To achieve the above object, in a model optimization adaptive control method of the present invention as shown in an embodiment, a state of a control object is detected; the detected state of the control object is made an initial value; and a simulation with a control rule, a control gain, and an instruction signal value, which control the control object, as parameters is sequentially carried out by using an internal model expressing its own control system and by a computation method to optimize a predetermined evaluation standard, so that the control rule, the control gain, and the instruction signal value to optimize the evaluation standard are obtained and the control object is controlled.

According to the present invention of the embodiment, the control rule, the control gain, and the instruction signal value to control the control object are obtained by using the internal model expressing its own control system, and by making the simulation with the detected present state of the control object as the initial value and with the computation method to optimize the previously determined evaluation standard, so that the hardware is not increased, and it becomes possible to make control most suitable for the control purpose when the normal function is still used.

DETAILED DESCRIPTION OF THE PREFERRED EMBODIMENT

Hereinafter, a model optimization adaptive control method of the present invention will be described with reference to FIGS. 1 to 7 on an embodiment in which attitude control of a spacecraft is cited as an example and an evaluation standard optimizing method is made genetic algorithm (GA).

Figure 1:
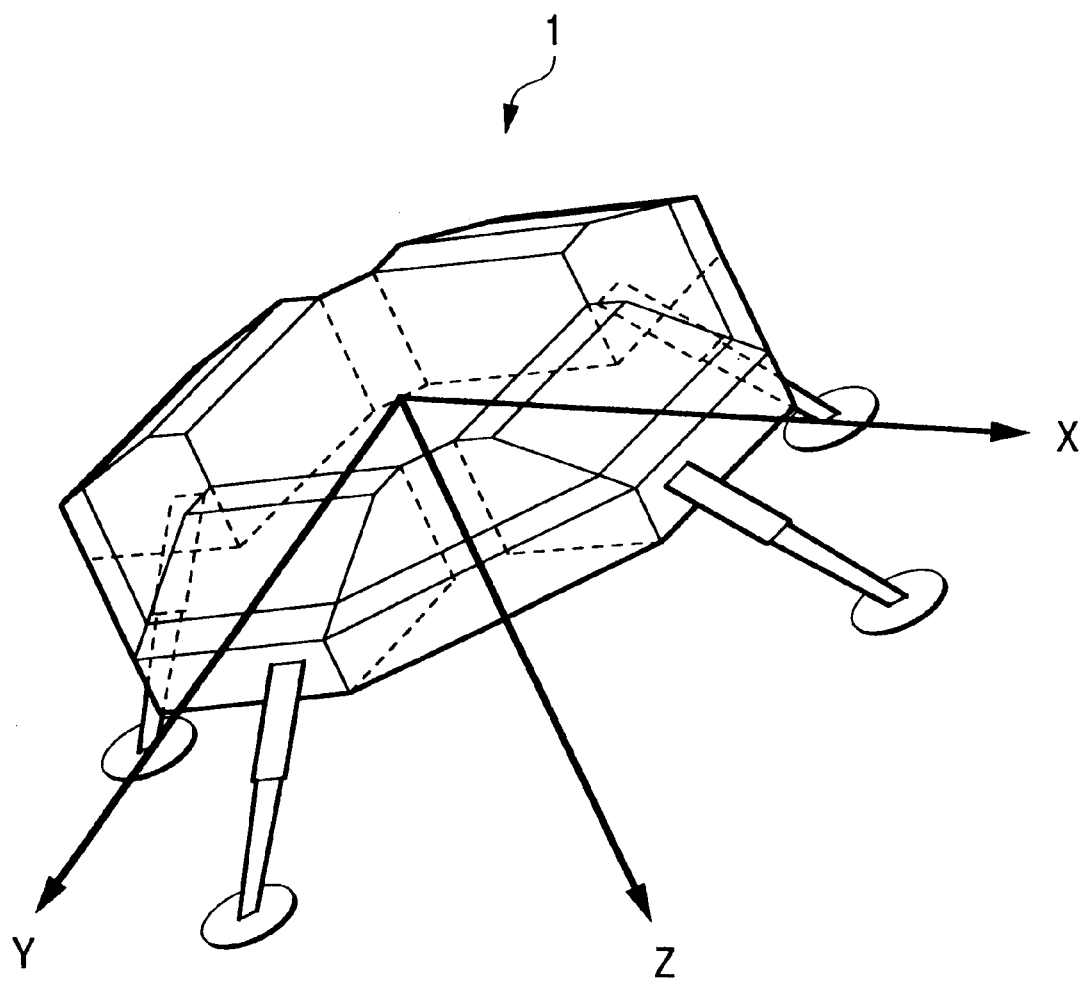
FIG. 1 is a perspective schematic external appearance view of a space craft showing an embodiment of a control method of the present invention.
Figure 2:
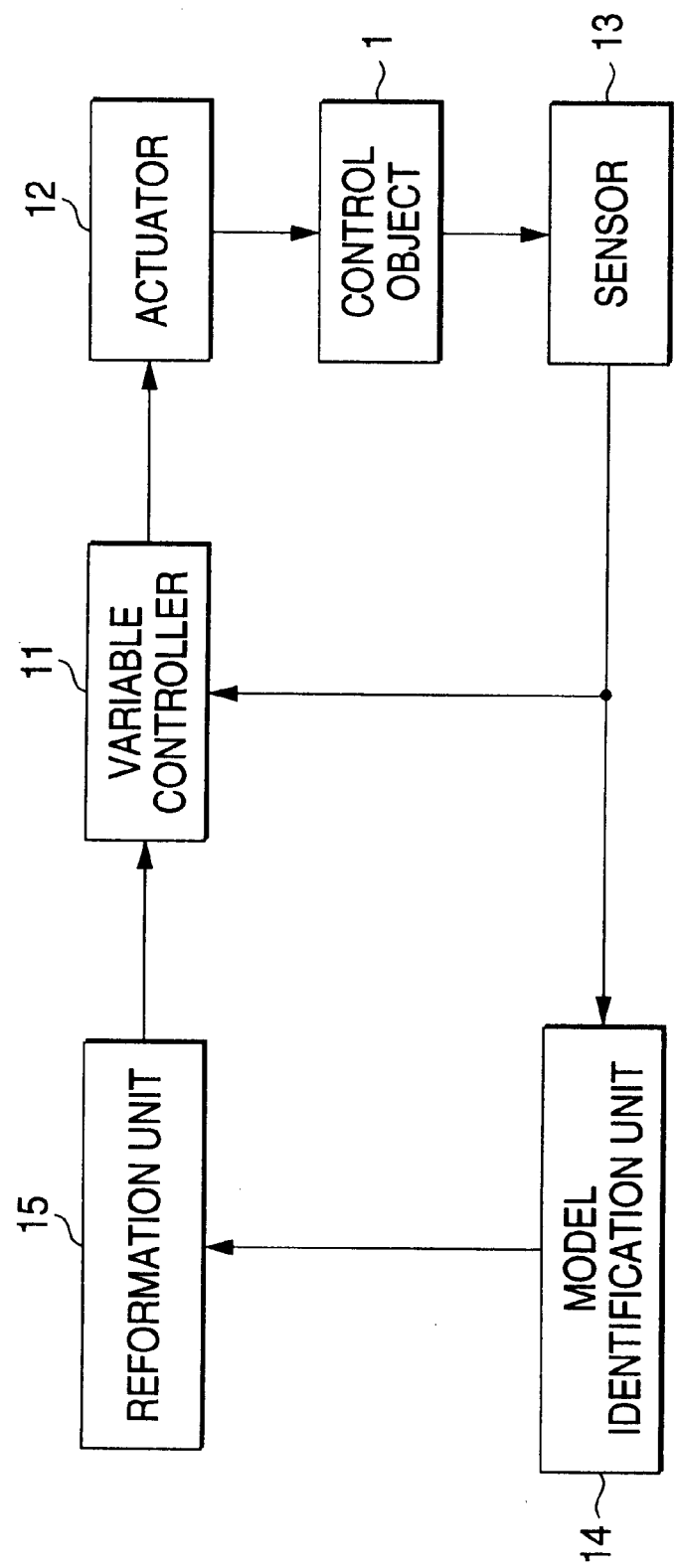
FIG. 2 is a block diagram showing a structure of an attitude control device of the present invention in the space craft shown in FIG. 1.
Figure 3:
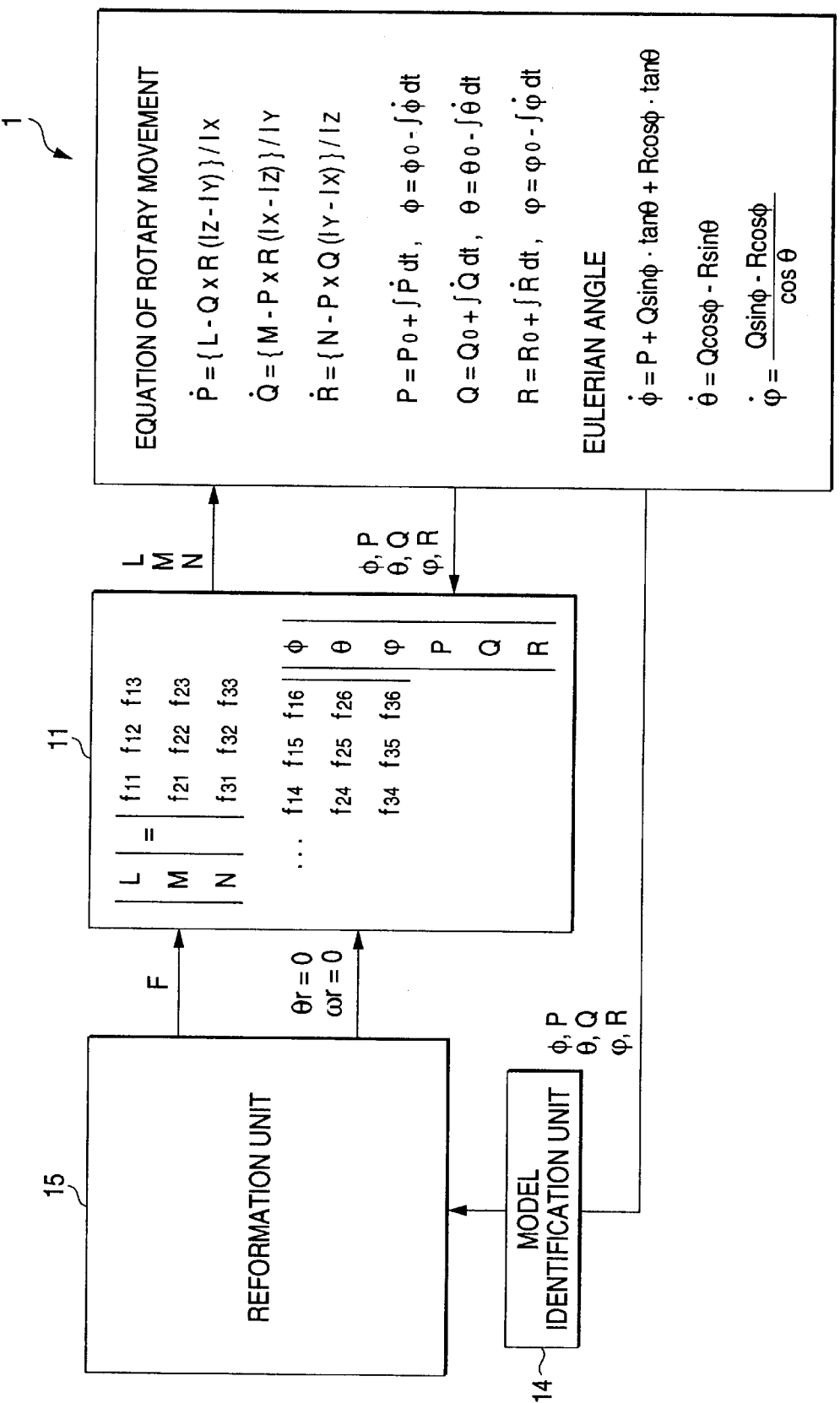
FIG. 3 is a view showing an example of a body portion of three-axis attitude control in the attitude control device shown in FIG. 2 with an equation of a rotary motion and an example of a controller portion with one equation.
Figure 4:
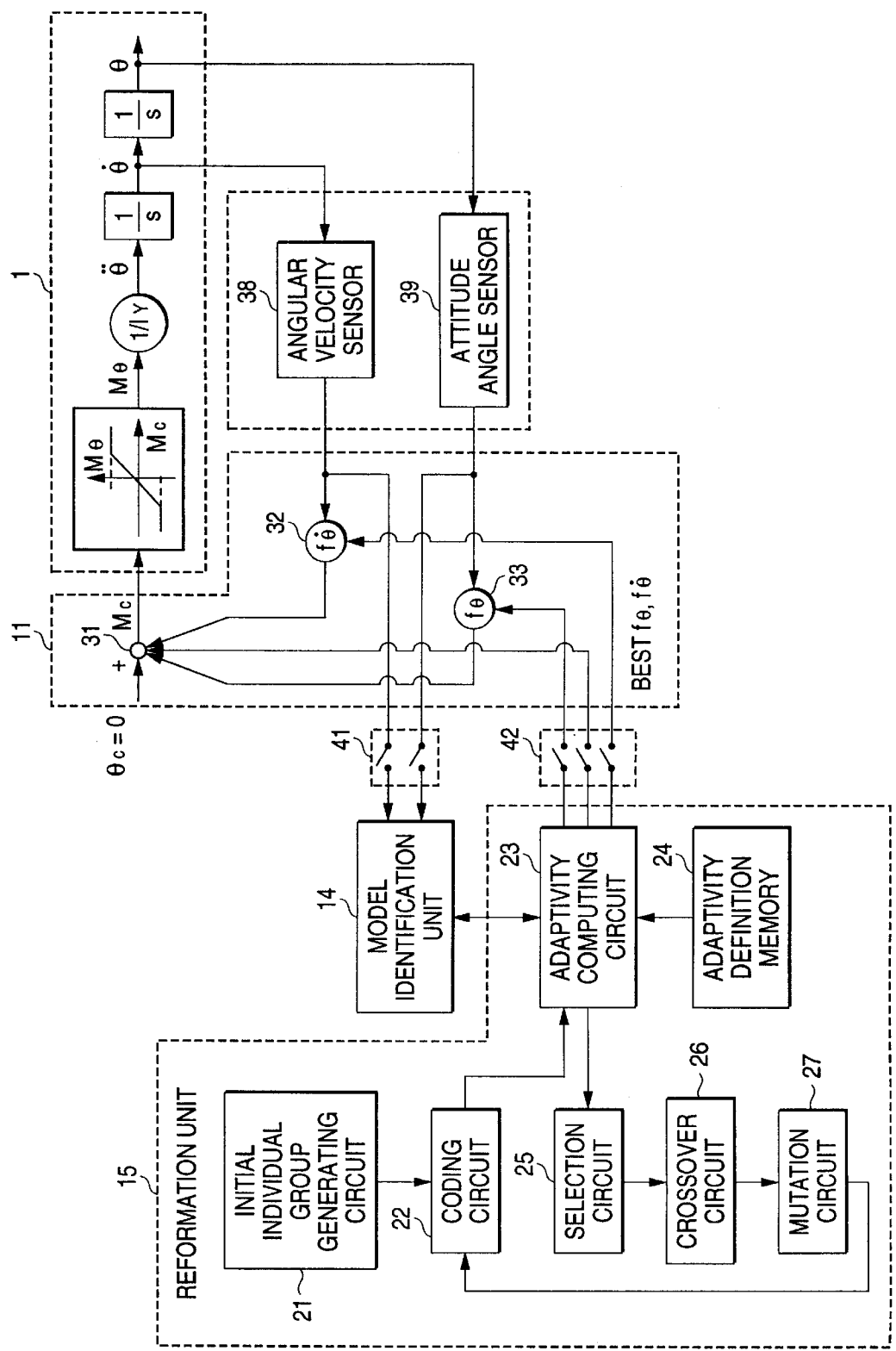
FIG. 4 is a block diagram in which only one axis of the three-axis attitude control of FIG. 3 is simplified and is extracted and which shows the processing procedure of a reformation unit.
Figure 5:
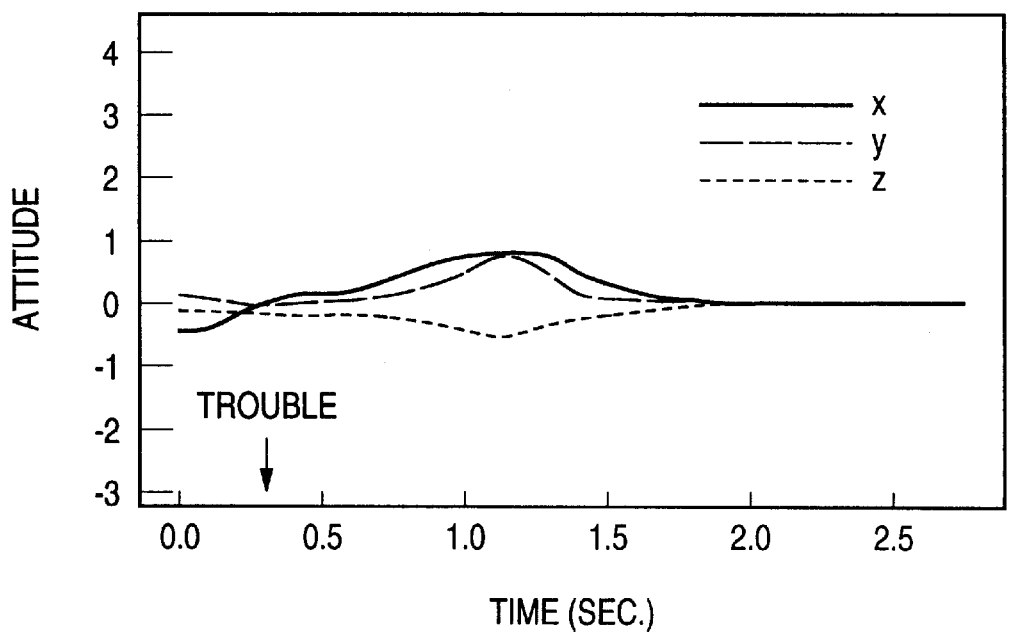
FIG. 5 is a time history of a body attitude showing an experimental result according to the embodiment.
Figure 6:
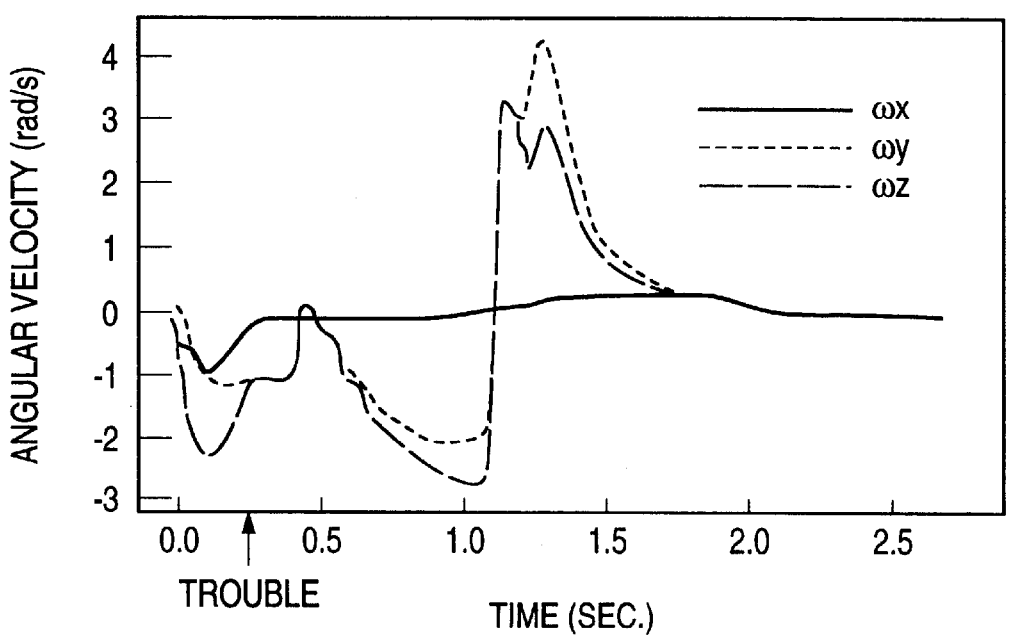
FIG. 6 is a time history of a body angular velocity similarly to the above.
Figure 7:
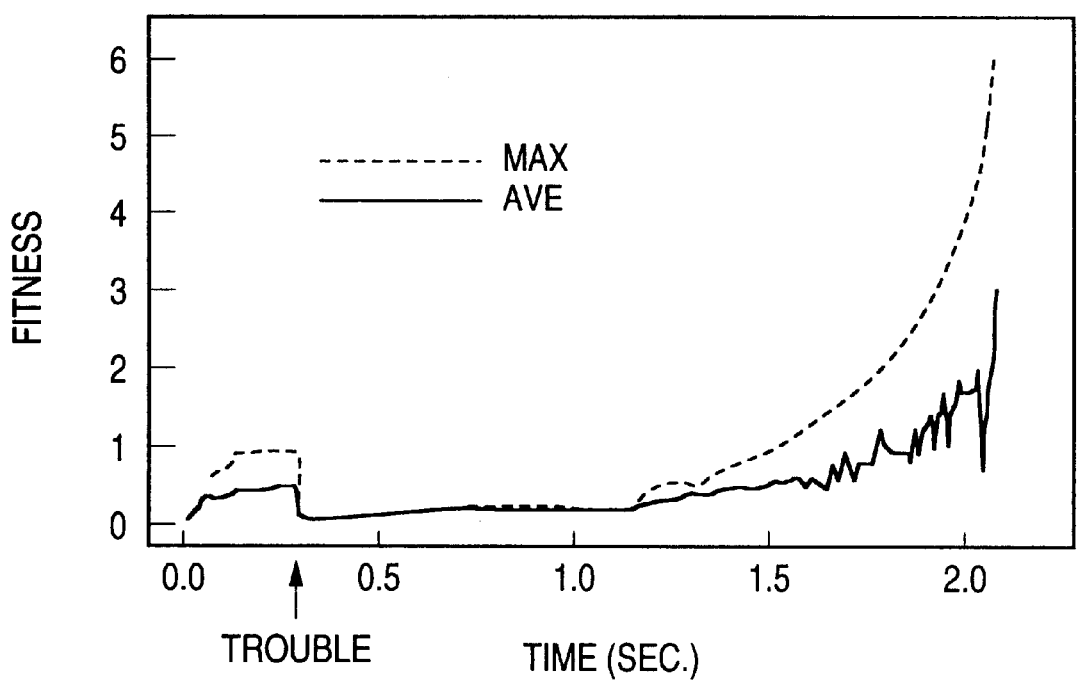
FIG. 7 is a graph showing the maximum value and average value of fitness of each generation by the GA similarly to the above.

This embodiment relates to the control of the attitude of a spacecraft as a control object. FIG. 1 is a schematic perspective view of the external appearance of a space craft, FIG. 2 is a block diagram showing a structure of an attitude control device of the present invention, and FIG. 3 is a view showing a body portion of FIG. 2 with an equation of a rotary motion and showing a controller portion with one equation. FIG. 4 is a block diagram in which only one axis of the three-axis attitude control of FIG. 3 is simplified and is extracted to show the details, and FIGS. 5 to 7 are graphs showing experimental results.

A spacecraft (body) 1 shown in FIG. 1 makes a rotary motion in a three-dimension space expressed by an X axis, a Y axis, and a Z axis, and as actuators, six thrusters (not shown) in total are attached to the body 1 to generate positive and negative rotation moments around the respective axes.

In this embodiment, as shown in FIG. 2, a controller 11 drives an actuator 12 to control the state of the body 1, a sensor 13 detects a state amount (attitude, angular velocity) of the body 1, and the detection signal is supplied to the controller 11 to make feedback control and is supplied to a model identification unit 14 to identify a control system model. A control rule, a control gain, and an instruction signal value of the controller 11 are obtained by a reformation unit 15 on the basis of the identified model to optimize a previously determined evaluation standard. This is instructed to the variable controller 11 to control the control rule, the control gain, and the instruction signal value of the controller 11 so that the controller 11 is reconfigured on line and the body 1 is controlled to attain a target attitude and a target angular velocity.

That is, as shown in FIG. 3, in accordance with an equation of a rotary motion with rotation moment vectors (L, M, N) with respect to the respective axes of X, Y and Z from the controller 11, the attitude of the body 1 is controlled through the corresponding actuator (not shown). Attitude angles ($\phi$, $\theta$, $\psi$) and angular velocities (P, Q, R) (P=$\omega$x, Q=$\omega$y, R=$\omega$z) with respect to the respective axes of the body 1 are detected by the corresponding sensors (not shown) and are supplied to the controller 11 and the model identification unit 14. On the basis of the model identified by the model identification unit 14, the reformation unit 15 supplies a target attitude vector ($\theta$r=0), a target angular velocity vector ($\omega$r=0), and a real numbered matrix F of a feedback gain to the controller 11 to optimize the previously determined evaluation standard, so that the controller 11 is reconfigured and the rotation moment vectors (L, M, N) of the body 1 are controlled. In FIG. 3, Ix, Iy and Iz stand for moment of inertia for each axial.

The reformation unit 15 uses the GA in this embodiment, reconfigures the controller 11 on line without limiting the set of models, and as shown in FIG. 4, includes an initial individual group generating circuit 21, a coding circuit 22, an adaptivity computing circuit 23, an adaptivity definition memory 24, a selection circuit 25, a crossover circuit 26, and a mutation circuit 27.

An initial individual group (for example, 50 individuals) of the initial individual group generating circuit 21 is supplied to the adaptivity computing circuit 23 through the coding circuit 22 only at first one time. With respect to each individual, the real numbered matrix F expressed by the individual is used, and a control simulation with the model identified by the model identification unit 14 is made. As a result of the control simulation, the adaptivity definition (for example, fitness 1/T, T is a control time until the body model becomes evaluation standard $\|\theta r-\theta+\|+\|\omega r-\omega\|\leq\delta$ in the simulation space) stored in the adaptivity definition memory 24 is used, the respective individuals are simulated and evaluated in the adaptivity computing circuit 23, and the individual to optimize the value of the fitness is selected.

After the next time, the selection circuit 25, the crossover circuit 26, and the mutation circuit 27 perform the genetic process, alternation of generations is repeated to cause evolution, and the control rule, the control gain, and the instruction signal value of the controller 11 are made to approach the desired solution.

Besides, the controller 11 includes a subtracter 31, an angular velocity gain adjuster 32, and an attitude angle gain adjuster 33, and the actuator 12 is driven on the basis of the control target value supplied to the subtracter 31.

The output of an angular velocity sensor 38 is supplied to the subtracter 31 after its gain is adjusted by the angular velocity gain adjuster 32, and the output of an attitude angle sensor 39 is supplied to the subtracter 31 after its gain is adjusted by the attitude angle gain adjuster 33. The respective gains of the angular velocity gain adjuster 32 and the attitude angle gain adjuster 33 are controlled by the corresponding control gain outputted from the adaptivity computing circuit 23 of the reformation unit 15. Besides, the instruction signal value outputted from the adaptivity computing circuit 23 is supplied to the subtracter 31. In this way, in the subtracter 31, the output of the angular velocity gain adjuster 32, the output of the attitude angle gain adjuster 33, and the instruction signal value from the adaptivity computing circuit 23 are subtracted from the control target value, and the actuator 12 is driven by the subtraction output.

In this embodiment, in FIG. 4, the outputs of the angular velocity sensor 38 and the attitude angle sensor 39 constituting the sensor 13 are supplied to the model identification unit 14 through a switch circuit 41. Besides, the control gain and the instruction signal value outputted from the adaptivity computing circuit 23 of the reformation unit 15 are supplied to the controller 11 through a switch circuit 42. The switch circuits 41 and 42 switch on at a predetermined period, for example, a period of 50 ms.

In this way, the model identification unit 14 samples the outputs of the angular velocity sensor 38 and the attitude angle sensor 39, and on the basis of those outputs, a next generation individual in the GA is generated by the reformation unit 15 in a period to the next sampling, and by the controller (here, real numbered matrix F shown in FIG. 3) expressed by the best individual in the generation, the body 1 is controlled until the next generation is generated.

In the model identification unit 14, on the basis of the sampled outputs of the angular velocity sensor 38 and the attitude angle sensor 39, the control object model is identified, and by using the identified model, as described above, the control simulation is performed for each individual using the real numbered matrix F expressed by the individual. As a result of the control simulation, each individual is evaluated in the adaptivity computing circuit 23. Incidentally, the initial state of the model is set by the state amount of the body 1 obtained from the angular velocity sensor 38 and the attitude angle sensor 39.

By repeating the above operation at a predetermined period, the control object is made to converge to a desired state.

FIGS. 5 to 7 show experimental results of this embodiment. FIGS. 5 and 6 show the attitude of the body and the displacement of the angular velocity from the stable state, and FIG. 7 shows the maximum value (Max) and average value (Ave) of fitness (1/T) of each individual in the GA. The experimental results are obtained in the case where a thruster causing the rotation moment around the +X axis breaks down at t=0.30 sec. From FIGS. 6 and 7, it is understood that after t=0.44 sec, the controller 11 is reconfigured by the on-line GA, and thereafter, as shown in FIGS. 5 to 7, the body 1 converges to the stable state, and the fitness is also raised with time.

Incidentally, the present invention is not limited to the above embodiment, but various modifications can be made within the range not departing from the gist of the present invention. For example, the present invention can be applied to not only the spacecraft but also widely to various automatic control systems in addition to a flying body such as an airplane. Besides, the reconfiguration of the controller is not limited to the GA, but other well known optimization methods, for example, the Newton-Raphson method or Monte Carlo method can also be used.

According to the control method of the present invention, the control rule, the control gain, and the instruction signal value for controlling the control object are obtained by using the inner model expressing its own control system, and by making the simulation through the computation method for optimizing the previously determined evaluation standard with the detected present state of the control object as the initial value. Thus, the hardware is not increased, and even if any state change occurs, under the identified state of the control object, it is possible to make the control most suitable for a control purpose when the normal function is still used, and fault tolerance in the case where a trouble occurs can be raised.

What is claimed is:

1. A model optimization adaptive control method of a control object comprising:

detecting a state of a control object;

identifying an internal model expressing its own control model for controlling the control object according to the state;

simulating sequentially the internal model with parameter including a control rule, a control gain, and an instruction signal value so as to calculate the parameter for optimizing a predetermined evaluation standard, and controlling an actuator of the control object by configuring the internal model according to the calculated parameter for optimizing a predetermined evaluation standard.

2. The method according to claim 1, wherein the internal model includes an individual group consisting of a plurality of individuals.

3. The method according to claim 2, further comprising:

evaluating the internal model according to the evaluation standard by simulating with each of said individuals.

4. A model optimization adaptive control method for attitude control of a spacecraft, comprising:

detecting a state of a control object to obtain a detected state of said control object;

setting the detected state of the control object as an initial value;

identifying an internal model corresponding to the control object stored in a control system;

simulating sequentially said internal model with parameter including a control rule, a control gain, and an instruction signal value so as to calculate the parameter for optimizing a predetermined evaluation standard, and controlling the control object according to the parameter for optimizing a predetermined evaluation standard.

5. A model optimization adaptive control method for attitude control of a spacecraft, comprising:

detecting a state of said spacecraft to obtain a detected state of said spacecraft;

setting the detected state of the spacecraft as an initial value;

identifying an internal model corresponding to the spacecraft stored in a control system;

simulating sequentially said internal model with parameter including a control rule, a control gain, and an instruction signal value so as to calculate the parameter for optimizing a predetermined evaluation standard, and controlling the spacecraft according to the parameter for optimizing a predetermined evaluation standard.

6. An apparatus for model optimization adaptive control of a control object comprising:

a sensor for detecting a state of a control object;

means for identifying an internal model expressing its own control model for controlling the control object according to the state;

means for simulating sequentially the internal model with parameter including a control rule, a control gain, and an instruction signal value so as to calculate the parameter for optimizing a predetermined evaluation standard, and controller for controlling an actuator of the control object by configuring the internal model according to the calculated parameter for optimizing a predetermined evaluation standard.

7. The apparatus according to claim 6, wherein the internal model includes an individual group consisting of a plurality of individuals.

8. The apparatus according to claim 7, further comprising:

an evaluator for evaluating the internal model according to the evaluation standard by simulating with each of said individuals.

9. An apparatus for a model optimization adaptive control for attitude control of a spacecraft, comprising:

a sensor for detecting a state of a control object to obtain a detected state of said control object;

means for setting the detected state of the control object as an initial value;

means for identifying an internal model corresponding to the control object stored in a control system;

means for simulating sequentially said internal model with parameter including a control rule, a control gain, and an instruction signal value so as to calculate the parameter for optimizing a predetermined evaluation standard, and controller for controlling the control object according to the parameter for optimizing a predetermined evaluation standard.

10. An apparatus for a model optimization adaptive control for attitude control of a spacecraft, comprising:

a sensor for detecting a state of said spacecraft to obtain a detected state of said spacecraft;

means for setting the detected state of the spacecraft as an initial value;

means for identifying an internal model corresponding to the spacecraft stored in a control system;

means for simulating sequentially said internal model with parameter including a control rule, a control gain, and an instruction signal value so as to calculate the parameter for optimizing a predetermined evaluation standard, and controller for controlling the spacecraft according to the parameter for optimizing a predetermined evaluation standard.

* * * * *